April 6, 1943. W. H. SALE 2,315,739
SUPPORTING BRACKET FOR VALVE
Filed Oct. 27, 1941
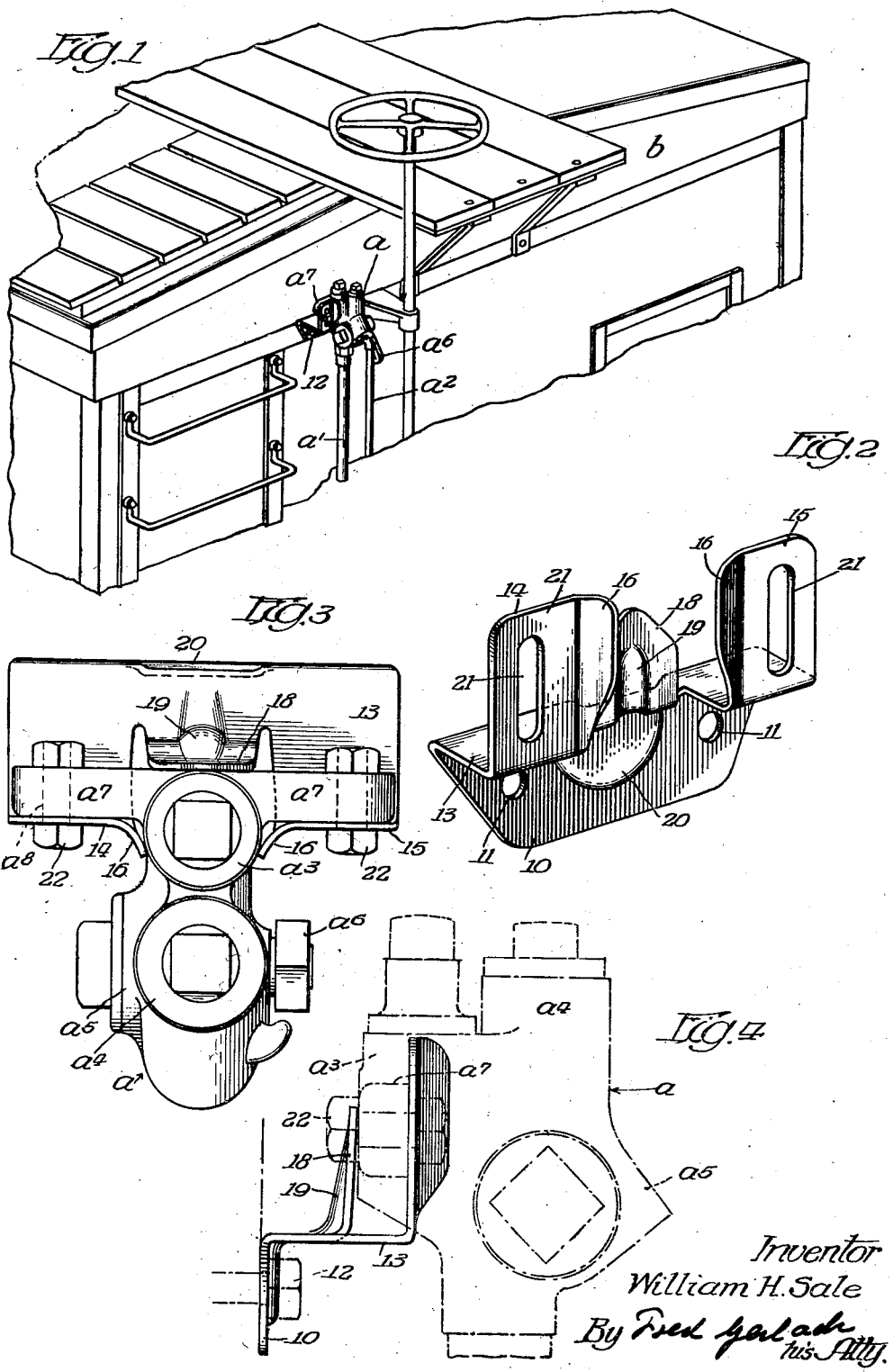
Inventor
William H. Sale
By Fred Gerlach
his Atty.

Patented Apr. 6, 1943

2,315,739

UNITED STATES PATENT OFFICE 2,315,739

SUPPORTING BRACKET FOR VALVES

William H. Sale, Sandston, Va.

Application October 27, 1941, Serial No. 416,606

8 Claims. (Cl. 303—1)

The invention relates to supporting brackets for valves.

One object of the invention is to provide an improved bracket for supporting valves such as are used for controlling air brakes on railway cars, and are known as retaining valves. These valves are usually mounted on a suitable portion of the railway car where they are accessible for operation. In practice it has been found that the constant vibration or shock to which the valves and brackets are subjected in transportation results in loosening or shearing bolts which secure the valve to the brackets or pipes where they are connected to the valve. One object of the invention is to provide an improved bracket which, in the event that the bolts become loose or sheared, will continue to support the valve and prevent the screw-threads on the pipe or pipes connected thereto from being stripped or broken. Another object of the invention is to provide a bracket which absorbs shock. Another object is to provide a one-piece bracket in which the valve is carried independently of the bolts for attaching the valve to the bracket, so that the valve will not be lost in the event that the attaching bolts fail. Another object of the invention is to provide an improved bracket of this type which can be economically produced from plate metal.

Other objects of the invention will appear from the description of the details.

The invention consists in the several novel features which are hereinafter set forth and are more particularly defined by claims at the conclusion hereof.

In the drawing, Fig. 1 is a perspective of a bracket embodying the invention applied to a railway car. Fig. 2 is a perspective of the valve supporting bracket. Fig. 3 is a plan of the bracket with a valve secured therein. Fig. 4 is a side elevation of the bracket, the valve being shown in dotted lines.

The invention is exemplified in a bracket which is adapted to secure a valve $a$ to one end of a railway car $b$. The valve $a$ has connected thereto an air supply pipe $a^2$ and an air exhaust pipe $a^1$. The casing of valve $a$ comprises a rear cylindrical portion $a^3$ which houses an exhaust valve, a front cylindrical portion $a^4$ which houses an inlet valve, and a body $a^5$ in which is mounted suitable mechanism for manually shifting the inlet and outlet valves by a handle $a^6$ on the outside of the valve casing. The valve-casing is provided with laterally extending ears or lugs $a^7$ which project from the rear cylindrical portion $a^3$ and which are each provided with a hole $a^8$ for a bolt for attaching them to the supporting bracket. The construction of the valve is well known and for that reason its details have not been shown.

The bracket is preferably formed of one piece of plate metal which is bent to form a vertically extending flange 10 which is provided with holes 11 through which bolts or screws 12 will pass into, for securing the bracket to a suitable wall or part of the railway car. The bracket also comprises a forward or horizontal extension 13 which is bent substantially at right angles to the flange 10 and a pair of upstanding members 14 and 15 which are formed by bending the metal of the plate upwardly from the front of the extension 13. Members 14 and 15 are spaced apart laterally to provide a space or slot between which the cylindrical portion $a^3$ of the valve casing will fit. This slot extends to the top of members 14 and 15 so that the valve and bracket may be assembled by relative vertical movement to bring the portion $a^3$ of the casing into the slot or space. Each of the members 14 and 15 is provided at its inner margin with a curved tongue or lip 16 which engages the sides of member $a^3$ of the valve-casing forwardly of its center so the casing will be held against forward displacement, as illustrated in Fig. 3. The bracket also comprises a rear upstanding member 18 which is struck-up from the metal of the plate between members 14 and 15 and is adapted to engage the back of the valve casing so that the portion $a^3$ of the casing will be confined against fore and aft movement. Being formed of plate metal the members 14, 15 and 18 are somewhat resilient so that the portion $a^3$ of the valve casing will be frictionally gripped between the front and rear upstanding members of the bracket. Back member 18 is bent to form a stiffening rib 19. The flange 10 and extension 13 are also shaped to form semi-circular stiffening zone 20 between them. Front members 14 and 15 are each provided with an elongated slot 21. Bolts 22 are adapted to pass through slots 21 and the holes $a^8$ in ears $a^7$ for rigidly securing the valve-casing to the bracket. The slots 21 provide for vertical adjustment of the valve relatively to the bracket.

When the bracket is in use, it will be fixedly secured to the railway car by screws 12. The portion $a^3$ of the valve will be resiliently gripped between the upstanding members 14, 15 and 18, and the valve will be fixedly secured to members 14 and 15 of the brackets by bolts 22. The resiliency in the upstanding members and the extension 13 will cushion the shock to which the valve is subjected during the travel of the railway car. This will relieve the shear stresses on the pipes connected to the valve which result from vibration. In the event that the bolts $a^8$ become loose or sheared off, the upstanding members of the brackets will support the casing so the pipes connected thereto will not become bent or broken, so that the loss of the valve will not result. The entire bracket is formed from a single plate of metal, can be produced at a low cost, and is efficient in operation. The stiffening portions make it possible to use relatively thin plate-metal.

The invention is not to be understood as restricted to the details set forth, since these may be modified within the scope of the appended claims without departing from the spirit and scope of the invention.

What I regard as new and desire to claim by Letters Patent is:

1. A carrying bracket for valves comprising a flange forming a back whereby the bracket can be secured to a support, a forward extension on and at the top of the flange, a pair of upstanding members on the front of the extension and spaced apart laterally to engage and hold between them a portion of the body of a valve-casing and an upstanding member on the extension forwardly of the flange, spaced rearwardly of the space between the front members and disposed to engage only the valve casing at the back of said body portion, so that a portion of the casing will be held between the front and rear upstanding members, the front members being extended to overlap the front of laterally projecting lugs on the casing.

2. A carrying bracket for valves comprising a flange forming a back whereby the bracket can be secured to a support, a forward extension on the flange, a pair of front upstanding members spaced apart laterally to hold between them a portion of a valve-casing and an upstanding member on the extension spaced rearwardly of the space between the front members and disposed to engage the back side of the valve-casing, so that a portion of the casing will be held between the front and rear upstanding members, said upstanding members being resilient and adapted to grip a portion of the valve-casing between them.

3. A carrying bracket for valves comprising a flange forming a back whereby the bracket can be secured to a support, a forward extension on and at the top of the flange, a pair of upstanding members on the front of the extension and spaced apart laterally to engage the sides of and hold between them a portion of the body of a valve-casing and an upstanding member on the extension spaced forwardly of the flange and rearwardly of the space between the front members and disposed to engage the valve-casing at the back of said body portion, so that a portion of the casing will be held between and by the front and rear upstanding members, the front members being extended laterally and provided with openings for bolting laterally projecting lugs on the casing to the bracket.

4. A valve carrying bracket comprising a flange forming a back whereby the bracket can be secured to a support, a forward extension on and at the top of the flange, a pair of front upstanding members spaced apart and having angular inner margins for engaging and holding between them a portion of the body of a valve-casing and an upstanding member on the extension forwardly of the flange, rearwardly of the space between the front members and disposed to engage the valve casing at the back of said body portion, so that said portion of the casing will be held between the front and rear upstanding members, the front members being extended laterally and provided with openings for bolting laterally projecting lugs on the casing to the bracket.

5. A carrying bracket for valves formed of plate metal and comprising a vertically extending flange forming a back whereby the bracket can be secured to a support, a forward extension on the flange, a pair of upturned members extending upwardly from the front of the extension, spaced apart laterally and having their inner margins adapted to engage the sides of a portion of the valve-casing, an upstanding member on the extension rearwardly of the space between the front members for engaging the back of the valve-casing, said extension and upstanding members being resilient to absorb shock.

6. A carrying bracket for valves formed of a single plate of metal and comprising a flange forming a back whereby the bracket can be secured to a support, a forward extension on the flange, a pair of upstanding members at the front of the extension, spaced apart laterally and having their inner margins bent forwardly and adapted to engage the sides of a portion of the valve-casing, an upstruck upstanding member rearwardly of the space between the front members, for engaging the back of the valve-casing, and securing the casing in the space between the front members, the extension and upstanding members being resilient to absorb shock, the front members being provided with slots for bolts adapted to pass through laterally extending lugs on the casing, for securing the casing to the bracket.

7. A carrying bracket for valves formed of plate metal and comprising a vertically extending flange forming a back whereby the bracket can be secured to a support, said flange being provided with an indented stiffening portion, a forward extension on the flange, a pair of upstanding members extending upwardly from the front of the extension, spaced apart laterally and having their inner margins adapted to engage the sides of a portion of the valve-casing, and an upstanding member on the extension, rearwardly of the space between the front members, for engaging the back of the valve-casing, the front members being provided with slots for bolts for securing laterally extending lugs on the casing to the bracket.

8. A valve carrying bracket formed of plate metal and comprising a vertically extending flange forming a back whereby the bracket can be secured to a support, said flange being provided with an indented stiffening portion, a forward extension on the flange, a pair of upturning members extending upwardly from the front of the extension, spaced apart laterally and having their inner margins bent to form portions for engaging the sides of a portion of the valve-casing, and an upstanding member intermediate the inner margins of the front members and rearwardly of the space between them for engaging the back of the valve-casing, and provided with an indented stiffening portion and adapted to secure the casing against the front members, the front members being provided with slots for bolts for securing laterally extending lugs on the casing to the bracket.

WILLIAM H. SALE.